US009383856B2

(12) United States Patent
Hung et al.

(10) Patent No.: US 9,383,856 B2
(45) Date of Patent: Jul. 5, 2016

(54) TOUCH SENSING CIRCUIT AND ASSOCIATED METHOD

(75) Inventors: Guo-Kiang Hung, Zhubei (TW);
Hsuan-I Pan, Zhubei (TW);
Ming-Chang Tsai, Zhubei (TW);
Meng-Chang Lee, Zhubei (TW);
Shih-Tsung Yang, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 350 days.

(21) Appl. No.: 13/253,391

(22) Filed: Oct. 5, 2011

(65) Prior Publication Data

US 2012/0086656 A1 Apr. 12, 2012

(30) Foreign Application Priority Data

Oct. 7, 2010 (TW) .............................. 99134234 A

(51) Int. Cl.
G06F 3/041 (2006.01)
G06F 3/045 (2006.01)

(52) U.S. Cl.
CPC .................................... G06F 3/0416 (2013.01)

(58) Field of Classification Search
CPC .................................................... G06F 3/0416
USPC ................................................. 345/173–179
See application file for complete search history.

(56) References Cited

U.S. PATENT DOCUMENTS

| | | | | |
|---|---|---|---|---|
| 5,841,078 A * | 11/1998 | Miller et al. | ............... | 178/18.06 |
| 6,278,283 B1 * | 8/2001 | Tsugai | ............... | 324/678 |
| 8,300,024 B2 * | 10/2012 | Wu | ............... | 345/173 |
| 8,638,304 B2 * | 1/2014 | Liu | ............... | G06F 3/0416 345/173 |
| 8,681,110 B2 * | 3/2014 | Huang | ............... | G06F 3/044 178/18.06 |
| 8,692,777 B2 * | 4/2014 | Staton | ............... | G06F 3/0412 178/18.02 |
| 2005/0001633 A1 * | 1/2005 | Okushima et al. | ............. | 324/658 |
| 2006/0132463 A1 * | 6/2006 | Lee | ............. | G06F 3/0412 345/173 |
| 2007/0229466 A1 * | 10/2007 | Peng et al. | ............. | 345/173 |
| 2009/0102814 A1 | 4/2009 | Lin et al. | | |
| 2009/0167585 A1 * | 7/2009 | Yeom | ............. | H03K 4/50 341/155 |
| 2009/0167718 A1 * | 7/2009 | Lee et al. | ............. | 345/174 |
| 2010/0066692 A1 * | 3/2010 | Noguchi | ............. | G06F 3/0412 345/173 |
| 2010/0097355 A1 * | 4/2010 | Jang et al. | ............. | 345/178 |
| 2010/0177059 A1 * | 7/2010 | Wang | ............. | H03K 17/9622 345/174 |
| 2010/0274404 A1 * | 10/2010 | Holbery | ............. | G01D 4/002 700/291 |
| 2011/0074725 A1 * | 3/2011 | Westerman | ............. | G06F 3/0418 345/174 |
| 2011/0261006 A1 * | 10/2011 | Joharapurkar et al. | ....... | 345/174 |

FOREIGN PATENT DOCUMENTS

TW 200919285 A 5/2009

OTHER PUBLICATIONS

Taiwan Office Action dated Jan. 24, 2014 citing prior art, 5 pages.

* cited by examiner

Primary Examiner — Temesgh Ghebretinsae
Assistant Examiner — Benyam Ketema
(74) Attorney, Agent, or Firm — Edell, Shapiro & Finnan, LLC

(57) ABSTRACT

A touch sensing circuit and method is provided. The touch sensing circuit discriminates a common voltage change of a display panel couple to the touch sensor in a touch panel display apparatus. The touch sensor comprises a plurality of sensor electrodes. The touch sensing circuit includes a plurality of channel circuits, each of which includes a reset switch and a sensing switch for alternately conducting an associated sensor electrode to a reset voltage and a charge collecting circuit. The channel circuits are divided to different groups that operate according to interleaving timings for encompassing possible common voltage changes.

14 Claims, 4 Drawing Sheets

TOUCH SENSING CIRCUIT AND ASSOCIATED METHOD

This application claims the benefit of Taiwan application Serial No. 99134234, filed Oct. 7, 2010, the subject matter of which is incorporated herein by reference.

BACKGROUND OF THE INVENTION

1. Field of the Invention

The invention relates in general to a touch sensing circuit and associate method, and more particularly, to a touch sensing circuit and associated method capable of detecting a common voltage change of a display panel in a touch panel display apparatus to eliminate effects of the common voltage change.

2. Description of the Related Art

A touch panel display apparatus, offering integrated functions of touch sensing of a touch panel and display of a display apparatus, provides a user-friendly and intuitive control interface and has thus become one of the most prevailing human-man-interfaces.

SUMMARY OF THE INVENTION

The invention is directed to lowering cost while also optimizing accuracy of touch sensing.

The present invention discloses a touch sensing circuit applied to a touch panel display. The touch sensing circuit comprises a plurality of first channel circuits and a plurality of second channel circuits. Each first channel circuit comprises a first sensing switch, a first reset switch, a first charge collecting circuit and an analog-to-digital converter. The first reset switch is coupled between the first sensor electrode and the first charge collecting circuit. The first charge collecting circuit comprises a storage capacitor and an amplifier. The amplifier has a positive input end, a negative input end and an output end. The positive input end is coupled to a first sensing voltage, the negative input end is coupled to the first sensing switch, and the output end is coupled to the analog-to-digital converter. The storage capacitor is coupled between the output end and the negative input end. Time points at which the first and second sensing switches are closed are interleaved.

During the first reset period, the first sensing switch is open, and the first reset switch is closed to conduct the first reset voltage to the first sensor electrode. During the first sensing period, the first reset switch is open, and the first sensing switch is closed to conduct the first sensing voltage to the first charge collecting circuit to collect charges of the first sensor electrode to the storage capacitor. The amplifier then converts the collected charges in the storage capacitor to a corresponding analog signal.

Each second channel circuit comprises a second sensing switch, a second reset switch, a second charge collecting circuit and a corresponding analog-to-digital converter. During the second reset period, the second sensing switch is open, and the second reset switch is closed to conduct a second reset voltage to the second sensor electrode. During the second sensing period, the second reset switch is open, and the second sensing switch is closed to conduct the second sensor electrode to the second charge collecting circuit that then couples the second sensing voltage to the second sensor electrode.

Preferably, the first and second sensing periods have equal durations but staggered start and end time points, so that the second reset period is covered by the first sensing period, and the first reset period takes places within the second sensing period.

Preferably, the first sensing voltage equals the second reset voltage, the second sensing voltage equals the first reset voltage, and the first sensing voltage differs from the first reset voltage. Further, the analog-to-digital converter in the first channel circuit samples and converts the analog signals from the first charge collecting circuit during the second reset period (e.g., before the second reset period ends) to corresponding digital signals. Similarly, the analog-to-digital converter in the second channel circuit converts the analog signals from the second charge collecting circuit during the first reset period to corresponding digital signals. When the analog-to-digital converter in the first channel circuit samples, between the first sensor electrode (conducted to the first sensing voltage) and the second sensor electrode (conducted to the second reset voltage) is no voltage difference, so as to prevent a coupling capacitor between the first and second sensor electrodes from affecting detection of common voltage change during touch sensing. Similarly, when the analog-to-digital converter in the second channel circuit samples, between the second sensor electrode (conducted to the second sensing voltage) and the first sensor electrode (conducted to the first reset voltage) is no voltage difference, so as to eliminate effects of the coupling capacitor between the electrodes.

The present invention further discloses a method for touch sensing applied to a touch sensor/touch panel display for detecting voltages states of a common voltage is provided. According to an amplitude of signals converted from charges respectively collected during a first sensing period and a second period of a first charge collecting circuit and a second charge collecting circuit, it is determined whether the voltage level of the common voltage changes during the first sensing period and/or the second sensing period.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
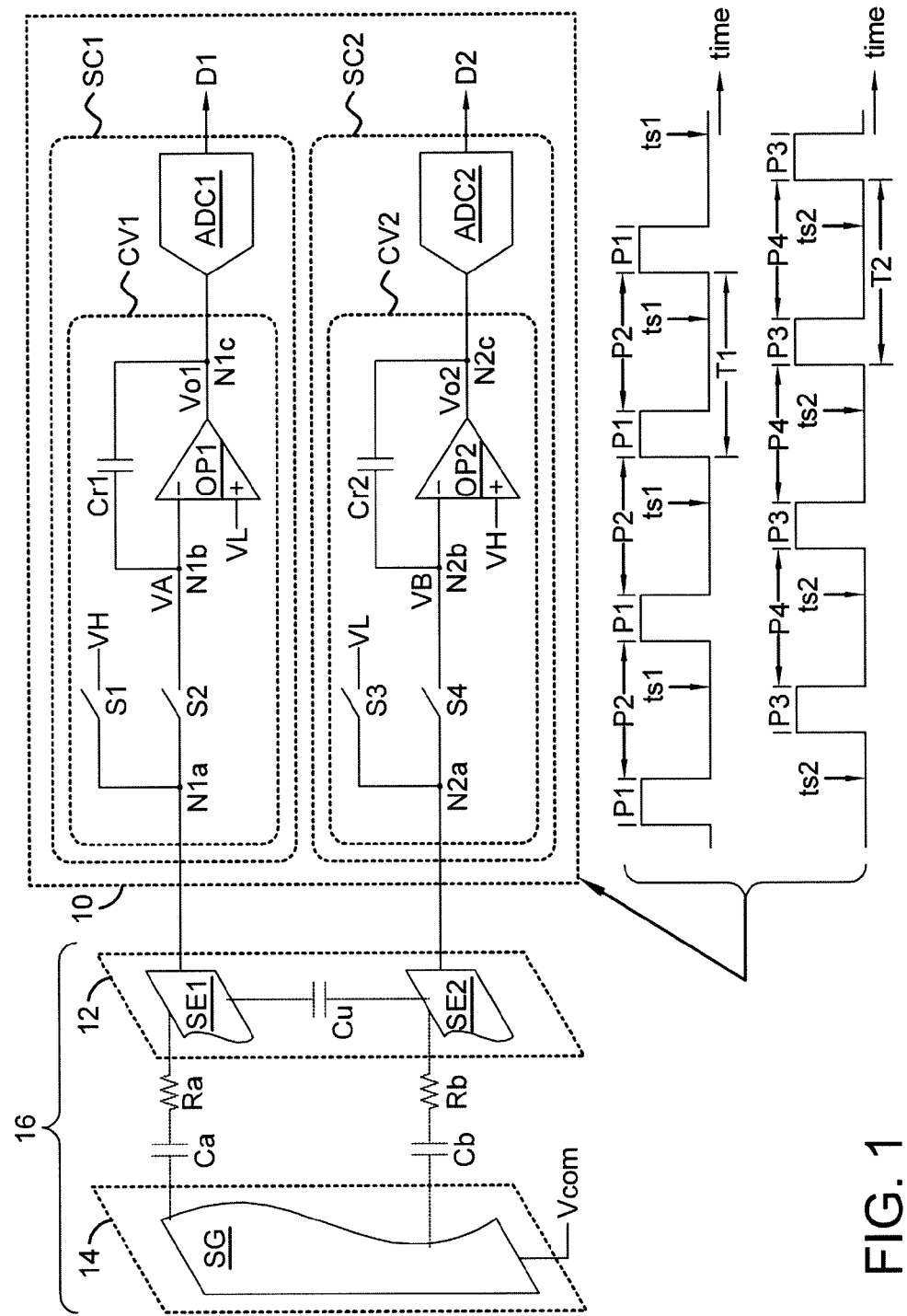
FIG. 1 is a touch sensing circuit according to an embodiment of the present invention.

FIG. 1 shows a touch sensing circuit 10 according to an embodiment of the invention. The touch sensing circuit 10 is applied to a touch panel display apparatus 16 that integrates a touch sensor 12 and a display panel 14. The touch sensor 12 comprises a plurality of mutually isolated sensor electrodes for touch sensing. In this embodiment, the sensor electrodes in the touch sensor 12 are divided into several groups, each of which comprises one or more sensor electrode(s). In FIG. 1, electrodes SE1 and SE2 respectively represent two different groups of electrodes. The touch sensing circuit 10 comprises a channel circuit SC1 corresponding to the electrode SE1 and a channel circuit SC2 corresponding to the electrode SE2.

The channel circuit SC1 comprises a capacitance-voltage converting circuit CV1 and an analog-to-digital converter ADC1. The capacitance-voltage converting circuit CV1 comprises switches S1 and S2, a capacitor Cr1, and an amplifier OP1, e.g., an operational amplifier. The switch S1 is coupled between a voltage VH, e.g., a constant voltage, and a node N1a, and then to the sensor electrode SE1 via the node Na1. The switch S2 is coupled between the node N1a and a node N1b. The capacitor Cr1 and the amplifier OP1 form a charge collecting circuit. The amplifier OP1 has a positive input end, a negative input end, and an output end at a node N1c. The amplifier OP1 has its positive input end coupled to a voltage VL, e.g. another constant voltage, and its negative input end coupled to the switch S2 at the node N1b. The capacitor Cr1 has its two ends respectively coupled to the negative input end and output end of the amplifier OP1 at the node N1b and the node N1c, and the analog-to-digital converter ADC1 is coupled to the output end of the amplifier OP1 at the node N1c.

FIG. 1 also depicts an operation timing diagram of the switches S1 and S2, which operate according to a cycle T1 comprising consecutive periods P1 and P2. The constant voltage VH is regarded as a reset voltage, and the period P1 is regarded as a reset period. During the reset period P1, the switch S2 is open, and the switch S1 is closed to conduct the sensor electrode SE1 to the reset voltage VH. During the period P2, the switch S1 is open, and the switch S2 for sensing is closed to conduct the sensor electrode SE1 to the charge collecting circuit. Voltages of the two input ends of the amplifier OP1 approximate each other due to virtual ground, so that the voltage VL couples to the node N1b, and then to the sensor electrode SE1 via the closed switch S2. With effects of the voltage VL, capacitance change in the sensor electrode SE1 is reflected as charges, which is then inputted to the capacitor Cr1 to signify the amount of charges in terms of voltage at the node N1c. More specifically, an amplitude of an analog signal Vo1 outputted at the node N1c by the amplifier OP1 represents a total charge change accumulated at the sensor electrode SE1 during the period P2, meaning that the period P2 is regarded as a sensing period of the cycle T1. The analog-to-digital converter ADC1 samples the signal Vo1 at a time point ts1 in the cycle T1 and converts the sampled signal to corresponding digital signal D1.

Similarly, the channel circuit SC2 of the sensor electrode SE2 is provided with a corresponding capacitance-voltage converting circuit CV2 and an analog-to-digital converter ADC2. Switches S3 and S4 serves respectively as a reset switch and a sensing switch, and an amplifier OP2 and a capacitor Cr2 form a charge collecting circuit to output a signal Vo2 at a node N2c. FIG. 1 also shows an operation timing diagram of the switches S3 and S4, which operate according to a cycle T2 comprising consecutive periods P3 and P4 respectively regarded as a reset period and a sensing period. For the channel circuit SC2, the voltage VL is a reset voltage. During the period P3, the switch S4 is open, and the switch S3 conducts the voltage VL to the sensor electrode SE2 via the node N2a. During the period P4, the switch S3 is open, and the switch S4 is closed to conduct the sensor electrode SE2 to the amplifier OP2, so that the voltage VH (the sensing voltage) is coupled to the sensor electrode SE2 via a node N2b to store the charges of the sensor electrode SE2 to the capacitor Cr2. An amplitude of signals at a node N2c represents a total charge change accumulated at the sensor electrode SE2 during the period P4. The analog-to-digital converter ADC2 samples the signal Vo2 at a time point ts2 in the cycle T2 and converts the sampled signal to corresponding digital signal D2. Preferably, the cycles T1 and T2 are substantially equal and synchronous.

In FIG. 1, the display panel 14 applies a common voltage electrode SG to transmit a common voltage Vcom. Therefore, an equivalent capacitor Ca is present between the sensor electrode SE1 and the common voltage electrode SG, and an equivalent resistor Ra is present due to self-resistance of the sensor electrodes and associated parasitic resistor. Similarly, another equivalent capacitor Cb and resistor Rb are present due to the sensor electrode SE2 and the common voltage electrode SG. Via the capacitors Ca and Cb, the common voltage Vcom is coupled to the sensor electrodes SE1 and SE2. Further, an equivalent cross-coupled capacitor Cu is present between the electrodes SE1 and SE2.

The touch sensor 12 utilizes a plurality of sensor electrodes provided at a sensing area to determine a touched position by sensing capacitance change caused by a user touch. When sensing capacitance changes, the sensor electrodes are periodically coupled to a predetermined reset voltage and charge collecting circuit during the reset period and the sensing period, respectively. During the reset period, the voltage of the sensor electrode is reset to the predetermined reset voltage; during the sensing period, the sensor electrode is set to another predetermined sensing voltage, so that a voltage difference between the reset voltage and the sensing voltage is reflected as a capacitance change coupled to the sensing electrode to cause a charge change. The charges of the sensor electrodes are collected during the sensing period, and analog signals representing the collected charges are sampled and converted to corresponding digital signals, thereby determining the touched position according to the digital signals.

To display an image, the display panel 14 conducts pixel driving voltages for a plurality of pixels of the image and the common voltage to drive the pixels. The common voltage Vcom is a common voltage for the pixels, and the common voltage electrode SG conducts the common voltage Vcom on a common voltage conducting layer extending over the entire display panel 14. When the touch sensor 12 and the display panel 14 are integrated into the touch panel display apparatus 16, an isolated sensor electrode, e.g., SE1 or SE2, together with the common voltage conducting layer form an equivalent capacitor (Ca or Cb), and the common voltage Vcom of the common voltage conducting layer is then coupled to the sensor electrode via the equivalent capacitor.

To drive pixels, the common voltage Vcom is in a periodic ladder-like waveform. Preferably, during touch sensing, cycles of the reset period and sensing period are shorter than and also asynchronous with those of the common voltage Vcom. Supposing the common voltage is maintained at a same level during the reset period and sensing period, a voltage difference between the reset period and sensing period is still consistent with a predetermined voltage difference between the reset voltage and sensing voltage, so that the signals obtained from the collected charges are capable of correctly reflecting the capacitance change by touch sensing. On the contrary, supposing the level of the common voltage Vcom changes during the sensing period, the voltage difference of the sensor electrodes between the reset period and sensing period is affected by the level change of the common voltage Vcom to lead to a value deviating from the predetermined value, so that corresponding signals generated from the collected charges fail to correctly reflect the touch sensing result.

To prevent erroneous touch sensing caused by a common voltage Vcom change, according to one embodiment of the present invention, the common voltage Vcom change is discriminated during touch sensing in order to eliminate effects due to the common voltage Vcom change. During the sensing period, a charge change caused when the voltage difference of the common voltage change takes effect on the equivalent capacitors between the sensor electrodes and the common voltage conducting layer is greater than a reasonable charge change of touch sensing. Thus, the present invention discriminates whether the common voltage change occurs during the sensing period in view of an amount of charge change.

It should be note that, rising time and falling time of the common voltage change may be influenced by all sorts of variables, e.g., fabrication process, temperature, operating voltage, and/or structure of the display panel. Timing of the common voltage change is independent from the touch sensing period. Preferably, different sensor electrodes are arranged with alternating sensing periods to observe occurrence of common voltage Vcom change.

Figure 2:
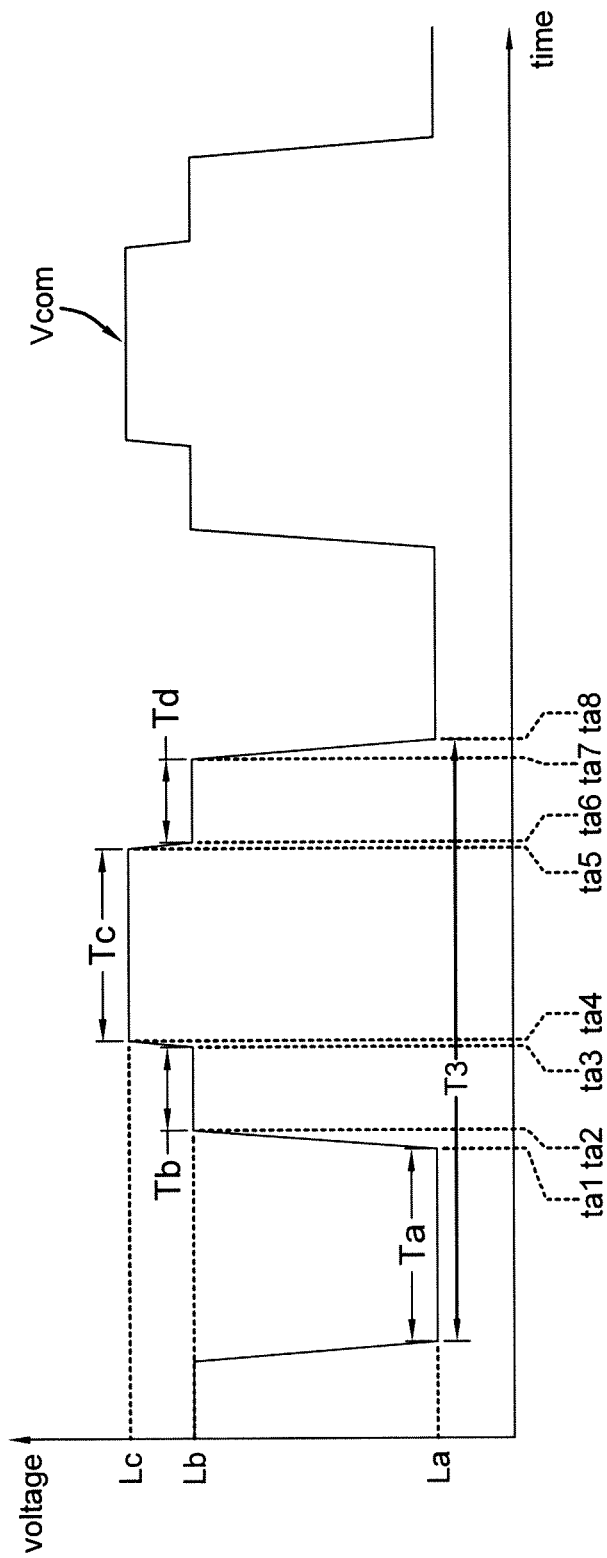
FIG. 2 is a diagram illustrating a timing of a common voltage change.

FIG. 2 illustrates that the common voltage Vcom drives pixels according to a cyclic step-like waveform, where the horizontal axis represents time and the vertical axis represents voltage. The common voltage Vcom repeats periods Ta to Td according to a cycle T3. During the period Ta, the common voltage Vcom is maintained at a level La. Between time points ta1 and ta2, the common voltage Vcom increase along a rising edge to a level Lb and is kept at the level Lb throughout the period Tb. Between time points ta3 and ta4, the common voltage Vcom rises to a level Lc and is kept at the level Lc throughout the period Tc. Between time points ta5 and ta6, the common voltage Vcom drops along a falling edge to the level Lb, and is kept at the level Lb throughout the period Td, and then again drops to the level La between the time points ta7 and ta8.

Again with reference to FIG. 1, to accommodate different requirements of touch sensing and pixel driving, preferably the cycles T1 and T2 for touch sensing are shorter than the cycle T3 for pixel driving, while the cycles T1 and T2 are non-synchronous with the cycle T3. Further, each of the periods Ta to Td of the cycle T3 encompasses several cycles T1. During touch sensing, supposing the common voltage Vcom is maintained at a same level during the reset period and sensing period, even when the sensor electrodes are coupled to the common voltage, a voltage difference between the reset period and sensing period is still consistent with a predetermined voltage difference between the reset voltage and sensing voltage, so that the capacitance change of touch sensing can be accurately reflected. For example, when the two adjacent periods P1 and P2 of the cycle T1 are encompassed by the period Tb, signals at the node N1c are capable of correctly representing the result of touch sensing. On the contrary, supposing the level of the common voltage Vcom changes during the sensing period, the voltage difference of the sensor electrodes between the reset period and sensing period also couples the level change of the common voltage to lead to a value deviating from the predetermined value, so that the touch sensing result cannot be correctly reflected. For example, the touch sensing at the period P2 is affected by the common voltage Vcom change (Lc-Lb) when the period P2 of the cycle T1 extends across the time points ta3 and ta4.

To prevent erroneous touch sensing caused by the common voltage Vcom variation, the touch sensing circuit 10 also discriminates whether the common voltage Vcom is changed during touch sensing to eliminate effects brought by the common voltage Vcom change. Taking the sensor electrode SE1 and the channel circuit SC1 for example, since the equivalent capacitor Ca between the sensor electrode SE1 and the common voltage electrode SG is several times the capacitance change from touch sensing, and the voltage change of the common voltage Vcom is also greater than the voltage difference (the difference between the voltages VH and VL) under normal touch sensing, the charge change caused by the common voltage Vcom in the capacitor Ca is greater than a reasonable charge change from touch sensing. In this embodiment, whether common voltage change occurs during the sensing period P2 is determined according to the amount of charges reflected by the signal Vo1 and signal D1. Preferably, threshold(s) can be defined according to charge change caused by the common voltage change and reasonable charge change from touch sensing. When the amplitude of the signal Vo1 reflected in the signal D1 exceeds the threshold during a period P2, it means that the level of the common voltage Vcom is changed during the period P2, and so the signal D1 detected during the period P2 is affected by the variation of the common voltage Vcom. The signal D1 detected during the period P2 is discarded to prevent the common voltage Vcom change from incurring erroneous touch sensing.

Figure 3:
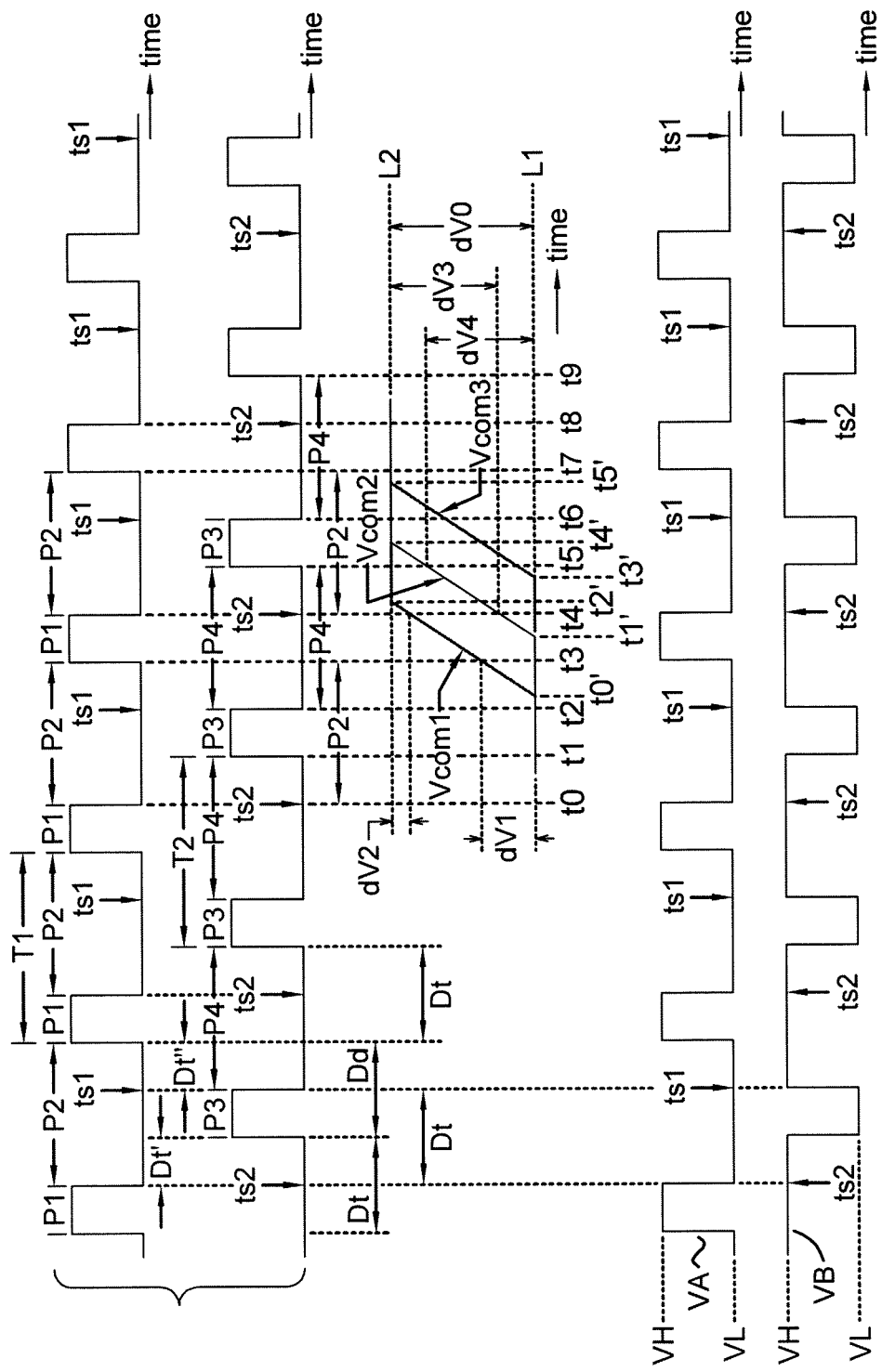
FIG. 3 is a timing diagram of operation timings of a touch sensing circuit according to an embodiment of the present invention.

Timing and slew rate of the common voltage change varies. In this embodiment, timings of the channel circuits SC1 and SC2 can be interleaved to cover the common voltage changes. Following description is given with reference to FIGS. 1 and 3. FIG. 3 shows an operation timing diagram of the touch sensing circuit 10, where the horizontal direction represents time. In this embodiment, the cycle T1 of the channel circuit SC1 is substantially the same as the cycle T2 of the channel circuit SC2; and the durations of reset periods P1 and P2, and the sensing periods P2 and P4 are also substantially the same, with time differences of intervals Dt and Dd in between, respectively. More specifically, when the channel circuit SC1 initiates the reset period P1, the channel circuit SC2 initiates the reset period P3 after the interval Dt. When the channel circuit SC2 initiates the reset period P3, the channel circuit SC1 initiates the reset period P1 after the interval Dd. The intervals Dt and Dd may be either equal or different. As shown in FIG. 3, such timing arrangement allows the reset period P1 of the channel circuit SC1 to fall within the sensing period P4 of the channel circuit SC2, and the reset period P3 of the channel circuit SC2 to fall within the sensing period P2 of the channel circuit SC1. Further, the sensing period P2 of the channel circuit SC1 partially overlaps with the sensing period P4 of the channel circuit SC2, and intervals Dt' and Dt" may be equal or different. Sensing is not performed when the channel circuit SC1 and SC2 operate during respective reset periods. Assuming the common voltage change occurs during a period that overlaps with a certain reset period of one of the channel circuits, the voltage variation of common voltage Vcom during that period is not reflected at that channel circuit. Meanwhile, since the reset period overlaps with the sensing period of the other channel circuit, the common voltage change during that period is reflected at the other channel circuit. Thus, with the channel circuits SC1 and SC2 that have interleaving timings, the common voltage change can be observed by one of the channel circuits.

In FIG. 3, when the common voltage Vcom1 rises from a level L1 at a time point t0' to reach a level L2 at a time point t2', a voltage difference dV0 caused is (L2–L1). Compared to the operating cycle T1 of the channel circuit SC1, a portion of the waveform Vcom1 overlaps with the reset period P1 at time points t3 and t4 since the change in the common voltage Vcom1 is relatively mild. During the sensing period P2 between time points t0 to t3, only partial voltage difference dV1 is reflected to the channel circuit SC1. Similarly, during the sensing period P2 between time points t4 and t7, only partial voltage difference dV2 is reflected to the channel circuit SC1. Preferably, with the interleaving timing arrangement, the voltage change dV0 caused by the common voltage during the sensing period P4 between the time points t2 and t5 is detected by the channel circuit SC2. In the event that the voltage differences dV1 and dV2 are not significant enough to be identified by the channel circuit SC1, the common voltage change can still be detected during the period P4 between the time points t2 and t5 according to the voltage difference dV0 by the channel circuit SC2.

In FIG. 3, the common voltage Vcom2 rises from the level L1 at a time point t1' to the level L2 at a time point t4'. For the channel circuit SC1, a front portion of the waveform Vcom2 between the time points t3 and t4 is overlaid by the reset period P1, and a partial voltage difference dV3 during the sensing period P2 between the time points t4 and t7 is reflected to the channel circuit SC1. Similarly, for the channel circuit SC2, a rear portion of the waveform Vcom2 is overlaid by the reset period P3 between the time points t5 and t6, and a partial voltage difference dV4 of the front portion during the sensing period P4 between the time points t2 and t5 is reflected to the channel circuit SC2. Since the equivalent capacitor Ca/Cb between the sensor electrode SE1/SE2 and the common voltage electrode SG is several times the capacitance change from touch sensing, the voltage differences dV3 and dV4 are greater than a voltage change (the difference between the voltages VH and VL) from normal touch sensing to accordingly determine that the common voltage change occurs.

In FIG. 3, supposing the common voltage Vcom3 changes between time points t3' and t5', the common voltage change is detected by the channel circuit SC1 during the sensing period between the time points t4 to t7 although a middle part of the waveform Vcom3 is overlaid by the reset period P3 of the channel circuit SC1 between the time points t5 and t6, and therefore the interfered data is discarded.

FIG. 3 also shows a voltage VA at the node N1b and a voltage NB at the node N2b. Preferably, the analog-to-digital converter ADC1 of the channel circuit SC1 samples and converts the analog signal Vo1 at the node N1c to corresponding digital signals D1. For example, the analog-to-digital converter ADC1 samples at a time point ts1 at the end of the reset period P3. Similarly, the analog-to-digital converter ADC2 of the channel circuit SC2 samples and converts the analog signal Vo2 during the reset period P1 to corresponding digital signals D2. For example, the analog-to-digital converter ADC2 samples at a time point ts2 at the end of the reset period P1. Accordingly, when the analog-to-digital converter ADC1 samples during the reset period P3, the sensor electrode SE1 is coupled to the voltage VA at the node N1b via the switch S2, and is virtually grounded to the voltage VL via the amplifier OP1, whereas the sensor electrode SE2 is coupled to the voltage VL via the switch S3. Hence, between the sensor electrodes SE1 and SE2 there is no voltage difference to prevent the coupling capacitor Cu between the two sensor electrodes SE1 and SE2 from affecting the detection of the common voltage change by the signal D1. Likewise, when the analog-to-digital converter ADC2 of the channel circuit SC2 samples during the sensing period P1, the sensor electrode SE1 is coupled to the voltage VH via the switch S1, whereas the sensor electrode SE2 is coupled to the voltage VH via the switch S4 and the amplifier OP2 to eliminate any voltage difference between the sensor electrodes SE1 and SE2, thereby avoiding effects of the coupling capacitor Cu between the sensor electrodes SE1 and SE2.

Figure 4:
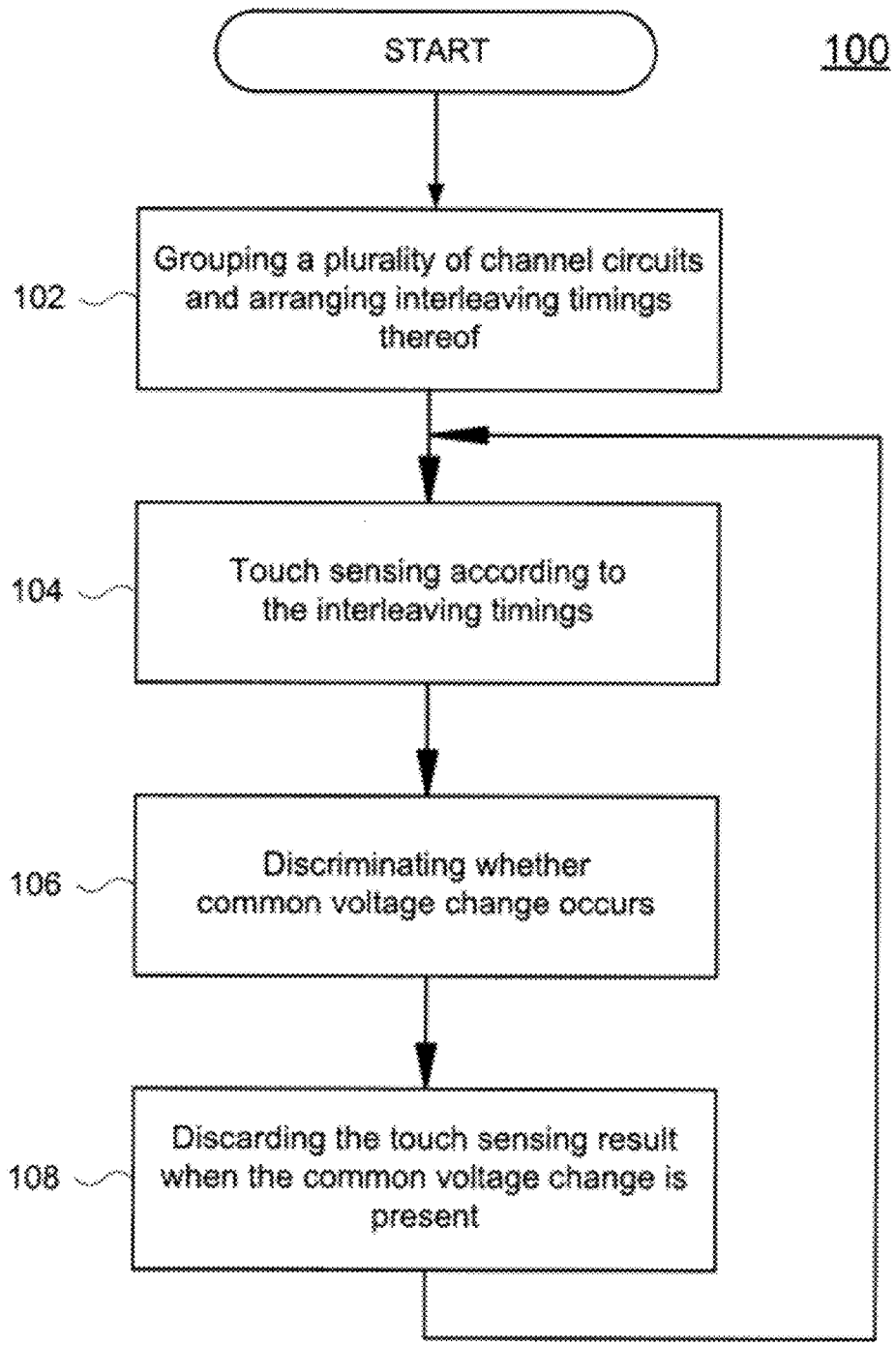
FIG. 4 is a flowchart of a method for touch sensing according to an embodiment of the present invention.

FIG. 4 shows a flowchart 100 of a method for realizing the touch sensing circuit 10 in FIG. 1. In Step 102, channel circuits in a touch sensing circuit are divided into groups, which are set to operate according to interleaving timings. In Step 104, the channel circuits of different groups operate according to the interleaving timings. For example, suppose a touch sensing circuit comprises 22 channel circuits. The 22 channel circuits are divided into two groups, so that 11 channel circuits of one group operate according to the timing of the channel circuit SC1 (FIG. 1), and the remaining 11 channel circuits of the other group operate according to the timing of the channel circuit SC2 to perform touch sensing during respective sensing periods P2 and P4. In Step 106, determine whether common voltage change occurs according to the embodiment disclosed above. In Step 108, when a touch sensing result of channel circuits of one of the groups of a certain period indicates the presence of the common voltage change, the sensing result during that certain period is discarded and is not taken into consideration in calculating a coordination of a touched position. Preferably, related touch sensing results nearby that sensing period of all the channel circuits may be discarded. Taking FIG. 3 for example, when the channel circuit SC2 detects a common voltage change in the waveform Vcom1 during the sensing period P4 between the time points t2 and t5, not only the channel circuit SC2 discards the signal D2 sampled during the sensing period P4, but also the channel circuit SC1 discards the signals D1 obtained from the time points t0 to t3 and t4 to t7; that is, digital outputs nearby the common voltage change of the waveform Vcom1 are all discarded. In contrast, supposing the channel circuits of the two groups do not detect the common voltage change, it means that the signals are clean being free from interference of the common voltage change, and so that signals obtained by all the channel circuits can be utilized to calculate a coordination of a touched position. It is to be noted that Steps 104 to 108 can be iterated to in realtime reflect user touches upon the touch sensor 12, and Steps 108 and/or 102 can be, for example, performed by a digital processor (not shown) in the touch sensing circuit 10.

With description of the embodiments given above, it is illustrated that, by identifying all common voltage changes of touch sensing performed according to interleaving timings, the present invention is capable of detecting the common voltage change of a display panel in a touch panel display apparatus to prevent the common voltage change from affecting results of touch sensing, thereby improving the accuracy of touch sensing as well as lowering production cost.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing circuit, comprising:
   a plurality of first channel circuits, each comprising:
   a first charge collecting circuit, having a first terminal connected to a second reset voltage; and
   a first sensing switch, coupled between a first sensor electrode and the first charge collecting circuit; wherein, the first sensor electrode is conducted to the first charge collecting circuit when the first sensing switch is closed; and
   a plurality of second channel circuits, each comprising:
   a second charge collecting circuit, having a second terminal connected to a first reset voltage; and
   a second sensing switch, coupled between a second sensor electrode and the second charge collecting circuit; wherein, the second sensor electrode is conducted to the second charge collecting circuit when the second sensing switch is closed, wherein time points at which the first sensing switch and the second sensing switch are closed are interleaved, wherein each first channel circuit further comprises a first reset switch coupled between the first electrode and the first reset voltage, and the first reset switch conducts the first reset voltage to the first sensor electrode when the first sensing switch is open, wherein the first reset switch turns on when the first sensing switch turns off, and the first sensing switch turns on when the first reset switch turns off, wherein each second channel circuit further comprises a second reset switch coupled between the second electrode and the second reset voltage; and the second reset switch conducts the second reset voltage to the second sensor electrode when the second reset switch is closed, and wherein a voltage value of the first reset voltage differs from a voltage value of the second reset voltage.

2. The touch sensing circuit according to claim 1, wherein the first charge collecting circuit couples a first sensing voltage to the first sensor electrode when the first sensing switch is closed, and the second charge collecting circuit couples a second sensing voltage to the second sensor electrode when the second sensing switch is closed; and the first sensing voltage equals the second reset voltage, and the first reset voltage equals the second sensing voltage.

3. The touch sensing circuit according to claim 2, wherein the first charge collecting circuit comprises a storage capacitor and an amplifier; the amplifier has a positive input end, a negative input end and an output end, the storage capacitor is coupled between the output end and the negative input end, the first sensing switch is coupled to the amplifier at the negative input end, and the first sensing voltage is coupled to the amplifier at the positive input end.

4. The touch sensing circuit according to claim 3, wherein each first channel circuit further comprises an analog-to-digital converter coupled to the output end; and the analog-to-digital converter is configured to start to sample and convert a signal at the output end when the second reset switch turns off to a corresponding digital signal.

5. The touch sensing circuit according to claim 1, wherein durations of the first and second sensing switches are equal, and the first and second sensing switches are not closed simultaneously.

6. A method for touch sensing, applied to a touch panel display apparatus comprising a plurality of sensor electrodes and a common voltage electrode with a common voltage, the method comprising:
collecting charges of the sensor electrodes during a sensing period, and converting the collected charges to corresponding signals;
determining whether the common voltage changes during the sensing period according to an amplitude of the corresponding signals, wherein the common voltage is used to drive pixels of the touch panel display; and
discarding a touch sensing result if it is determined that the common voltage changes during the sensing period.

7. The method according to claim 6, wherein the sensor electrodes comprise a plurality of first sensor electrodes and a plurality of second sensor electrodes, charges of the first sensor electrodes are collected within the sensing period.

8. The method according to claim 7, further comprising:
arranging another sensing period, in order that the sensing period and the another sensing period do not begin simultaneously;
collecting charges of the second sensor electrodes during the another sensing period, and converting the collected charges to a plurality of corresponding second signals; and
determining whether the common voltage changes during the another sensing period according to an amplitude of the second signals.

9. The method according to claim 8, wherein the arranging step further arranges durations of the sensing period and the another sensing period to be equal.

10. The method according to claim 8, further comprising:
conducting a first reset voltage to the first sensor electrodes during a first reset period;
conducting a second reset voltage to the second sensor electrodes during a second reset period;
coupling the first electrodes to a first sensing voltage during the sensing period; and
coupling the second sensor electrodes to a second sensing voltage during the another sensing period.

11. The method according to claim 10, wherein the first sensing voltage equals the second reset voltage, and the second sensing voltage equals the first reset voltage.

12. The method according to claim 11, further comprising:
sampling and converting the signals to corresponding first digital signals during the second reset period; and
sampling and converting the second signals to corresponding second digital signals during the first reset period.

13. A touch sensing circuit, comprising:
a plurality of first channel circuits, each comprising:
a first charge collecting circuit, having a first terminal connected to a second reset voltage; and
a first sensing switch, coupled between a first sensor electrode and the first charge collecting circuit; wherein, the first sensor electrode is conducted to the first charge collecting circuit when the first sensing switch is closed; and
a plurality of second channel circuits, each comprising:
a second charge collecting circuit, having a second terminal connected to a first reset voltage; and
a second sensing switch, coupled between a second sensor electrode and the second charge collecting circuit; wherein, the second sensor electrode is conducted to the second charge collecting circuit when the second sensing switch is closed,
wherein time points at which the first sensing switch and the second sensing switch are closed are interleaved, and
wherein a voltage value of the first reset voltage differs from a voltage value of the second reset voltage.

14. The touch sensing circuit according to claim 13, wherein each first channel circuit further comprises a first reset switch coupled between the first electrode and the first reset voltage, and the first reset switch conducts the first reset voltage to the first sensor electrode when the first sensing switch is open, and the first reset switch turns on when the first sensing switch turns off, and the first sensing switch turns on when the first reset switch turns off.

* * * * *